US011415036B2

(12) United States Patent
Weigl et al.

(10) Patent No.: US 11,415,036 B2
(45) Date of Patent: Aug. 16, 2022

(54) APPARATUS AND METHOD FOR ASCERTAINING A HEATING TEMPERATURE OF A HEATING ELEMENT FOR AN ELECTRICALLY HEATABLE CATALYTIC CONVERTER

(71) Applicant: Vitesco Technologies GmbH, Hannover (DE)

(72) Inventors: Manfred Weigl, Munich (DE); Gerhard Haft, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 134 days.

(21) Appl. No.: 16/755,582

(22) PCT Filed: Sep. 19, 2018

(86) PCT No.: PCT/EP2018/075290
§ 371 (c)(1),
(2) Date: Apr. 12, 2020

(87) PCT Pub. No.: WO2019/072503
PCT Pub. Date: Apr. 18, 2019

(65) Prior Publication Data
US 2021/0372314 A1 Dec. 2, 2021

(30) Foreign Application Priority Data
Oct. 13, 2017 (DE) ...................... 10 2017 218 374.8

(51) Int. Cl.
*F01N 11/00* (2006.01)
*F01N 3/20* (2006.01)
(Continued)

(52) U.S. Cl.
CPC ............ *F01N 11/00* (2013.01); *F01N 3/2026* (2013.01); *F01N 13/008* (2013.01); *G01K 1/08* (2013.01);
(Continued)

(58) Field of Classification Search
CPC ...... F01N 11/00; F01N 3/2026; F01N 13/008; F01N 2240/16; F01N 2560/06;
(Continued)

(56) References Cited

U.S. PATENT DOCUMENTS 5,499,497 A  3/1996  Defreitas ........................ 60/776
5,706,652 A  1/1998  Sultan ............................. 60/274
(Continued)

FOREIGN PATENT DOCUMENTS

CN   102733198 A   10/2012   ............. C08G 18/12
CN   103161546 A    6/2013   ............. F01N 11/00
(Continued)

OTHER PUBLICATIONS

Japanese Office Action, Application No. 2020520605, 3 pages, dated Mar. 15, 2021.
(Continued)

*Primary Examiner* — Brandon D Lee
(74) *Attorney, Agent, or Firm* — Slayden Grubert Beard PLLC

(57) ABSTRACT

Various embodiments include an apparatus for ascertaining a heating temperature of a heating element for an electrically heatable catalytic converter comprising: a catalytic converter housing surrounding the heating element and the catalytic converter; a first temperature sensor arranged in the housing; and a second temperature sensor arranged in the housing downstream of the first temperature sensor with regard to an exhaust gas flow direction within the housing. The first temperature sensor is exposed to radiation from the (Continued)

heating element and the second temperature sensor is shielded from radiation from the heating element.

10 Claims, 3 Drawing Sheets

(51) Int. Cl.
   *F01N 13/00* (2010.01)
   *G01K 1/08* (2021.01)

(52) U.S. Cl.
   CPC ...... *F01N 2240/16* (2013.01); *F01N 2560/06* (2013.01); *F01N 2560/14* (2013.01)

(58) Field of Classification Search
   CPC .......... F01N 2560/14; F01N 3/20; F01N 9/00; F01N 13/00; F01N 3/027; F01N 3/2013; F01N 3/28; G01K 1/08; G01K 7/16; Y02A 50/20; Y02T 10/12
   See application file for complete search history.

(56) References Cited

U.S. PATENT DOCUMENTS

| | | | |
|---|---|---|---|
| 5,740,675 A | 4/1998 | Shimasaki et al. | 60/274 |
| 8,061,128 B2* | 11/2011 | Crosbie | F01N 11/002 60/295 |
| 8,388,901 B2 | 3/2013 | Shigeura et al. | 422/198 |
| 8,423,221 B2 | 4/2013 | Watanabe | 701/22 |
| 8,813,478 B2 | 8/2014 | Gonze et al. | 60/286 |
| 8,839,605 B2 | 9/2014 | Gonze et al. | 60/286 |
| 2006/0078464 A1 | 4/2006 | Alleving et al. | 422/62 |
| 2007/0025894 A1* | 2/2007 | Shore | B01J 19/2485 422/211 |
| 2007/0266701 A1 | 11/2007 | Cheng | 60/295 |
| 2008/0083217 A1 | 4/2008 | Schweiggart | 60/320 |
| 2010/0089042 A1 | 4/2010 | King et al. | 60/295 |
| 2010/0319315 A1 | 12/2010 | Gonze et al. | 60/273 |
| 2010/0326403 A1 | 12/2010 | Gonze et al. | 123/436 |
| 2011/0258992 A1 | 10/2011 | Gonze et al. | 60/297 |
| 2012/0041596 A1* | 2/2012 | Thompson | F01N 11/002 700/271 |
| 2012/0255285 A1* | 10/2012 | Gonze | F01N 11/002 60/286 |
| 2013/0239554 A1 | 9/2013 | Gonze et al. | 60/286 |
| 2015/0092809 A1* | 4/2015 | Khaled | F01N 11/002 374/4 |
| 2016/0107120 A1 | 4/2016 | Hallowell | 422/109 |
| 2017/0002714 A1 | 1/2017 | De Smet et al. | 60/274 |
| 2018/0142599 A1 | 5/2018 | Pannuzzo et al. | |

FOREIGN PATENT DOCUMENTS

| | | | |
|---|---|---|---|
| CN | 103321723 A | 9/2013 | F01N 13/08 |
| CN | 106321205 A | 1/2017 | F01N 11/00 |
| DE | 4228536 A1 | 3/1994 | F01N 11/00 |
| DE | 112010001368 T5 | 6/2012 | F01N 11/00 |
| DE | 102012204779 A1 | 10/2012 | B01D 53/94 |
| DE | 102015200125 A1 | 7/2016 | F01N 11/00 |
| DE | 102017127049 A1 | 5/2018 | F01N 11/00 |
| EP | 1527264 | 5/2007 | F01N 11/00 |
| EP | 2546487 A1 | 1/2013 | B60K 6/445 |
| EP | 2732995 B1 | 1/2015 | B60H 1/22 |
| JP | 5935620 U | 3/1984 | F01N 13/14 |
| JP | 2006207403 A | 8/2006 | F01N 13/00 |
| WO | 2008/147068 A1 | 12/2008 | F01N 3/027 |
| WO | 2019/072503 A1 | 4/2019 | F01N 13/00 |

OTHER PUBLICATIONS

German Office Action, Application No. 102017218374.8, 5 pages, dated Jul. 5, 2018.
International Search Report and Written Opinion, Application No. PCT/EP2018/075290, 20 pages, dated Jan. 23, 2019.
Chinese Office Action, Application No. 201880066705.X, 4 pages, dated Nov. 25, 2021.
Chinese Office Action, Application No. 201880066705.X, 17 pages, dated May 8, 2021.

* cited by examiner

APPARATUS AND METHOD FOR ASCERTAINING A HEATING TEMPERATURE OF A HEATING ELEMENT FOR AN ELECTRICALLY HEATABLE CATALYTIC CONVERTER

CROSS-REFERENCE TO RELATED APPLICATIONS

This application is a U.S. National Stage Application of International Application No. PCT/EP2018/075290 filed Sep. 19, 2018, which designates the United States of America, and claims priority to DE Application No. 10 2017 218 374.8 filed Oct. 13, 2017, the contents of which are hereby incorporated by reference in their entirety.

TECHNICAL FIELD

The present disclosure relates to motor vehicles. Various embodiments may include apparati and/or methods for ascertaining a heating temperature of a heating element for an electrically heatable catalytic converter, which apparatus and method can each contribute to reliable and low-pollution operation of the motor vehicle.

BACKGROUND

Motor vehicles comprising internal combustion engines typically have catalytic converters which serve for exhaust gas aftertreatment. The pollutant emissions in the exhaust gas can be reduced by means of a catalytic converter. Some motor vehicles have electrically heatable catalytic converters in order to set a useful operating temperature of the catalytic converter quickly by means of a heating element. A desired operating temperature of the catalytic converter can be set with knowledge of the temperature of the heating element. However, a function of this kind of the electric catalytic converter heating is based on evaluating heated exhaust gas flows and therefore takes place only after a certain run-up time with the internal combustion engine running.

SUMMARY

The teachings of the present disclosure describe apparati and methods for ascertaining a heating temperature of a heating element for an electrically heatable catalytic converter, which apparatus and method can each contribute to reliable and low-pollution operation of a motor vehicle. For example, some embodiments include an apparatus (10) for ascertaining a heating temperature of a heating element (11) for an electrically heatable catalytic converter (12), comprising: the heating element (11) and the catalytic converter (12), which are arranged within a catalytic converter housing (17), and a first temperature sensor (13) and a second temperature sensor (14), which are arranged within the catalytic converter housing (17), wherein the first temperature sensor (13) is arranged closer to the heating element (11) than the second temperature sensor (14) with respect to an exhaust gas flow direction (R) within the catalytic converter housing (17).

In some embodiments, there is a shielding (15) which is arranged between the first and the second temperature sensor (13, 14) with respect to the exhaust gas flow direction (R) within the catalytic converter housing (17), so that the second temperature sensor (14) is shielded from thermal radiation of the heating element (11).

In some embodiments, the shielding (15) has two metal sheets.

In some embodiments, there is a sensor interface (16) which is arranged on the catalytic converter housing (17) and is designed for mechanically receiving the first and/or the second temperature sensor (13, 14).

In some embodiments, the first and the second temperature sensor (13, 14) are designed as a common sensor assembly (18).

In some embodiments, the first and the second temperature sensor (13, 14) and the shielding (15) are designed as a common sensor assembly (18) and are arranged one behind the other with respect to the exhaust gas flow direction (R).

In some embodiments, there is the first and/or the second temperature sensor (13, 14) are/is each designed as an exhaust gas temperature sensor and have/has a thermistor and/or a thermocouple.

As another example, some embodiments include a motor vehicle (1) comprising: an apparatus (10) for ascertaining a heating temperature of a heating element (11) for an electrically heatable catalytic converter (12) as described above, which apparatus is arranged in or on the motor vehicle (1).

As another example, some embodiments include a method for ascertaining a heating temperature of a heating element (11) for an electrically heatable catalytic converter (12) by means of an apparatus (10) as described above, comprising: actuating the heating element (11) for heating the catalytic converter (12), receiving a first temperature measurement signal by means of the first temperature sensor (13), which first temperature measurement signal is representative of a first temperature within the catalytic converter housing (17), receiving a second temperature measurement signal by means of the second temperature sensor (14), which second temperature measurement signal is representative of a second temperature within the catalytic converter housing (17), ascertaining a temperature gradient over time depending on the first and the second temperature measurement signal, and ascertaining a heating temperature of the heating element (11) depending on the ascertained temperature gradient over time.

In some embodiments, in which ascertaining a heating temperature of the heating element (11) comprises: ascertaining the heating temperature of the heating element (11) depending on provided data which comprise system-specific information about the apparatus (10).

BRIEF DESCRIPTION OF THE DRAWINGS

Exemplary embodiments of the teachings herein are explained in more detail below on the basis of the schematic drawings, in which.

DETAILED DESCRIPTION

Figure 1:
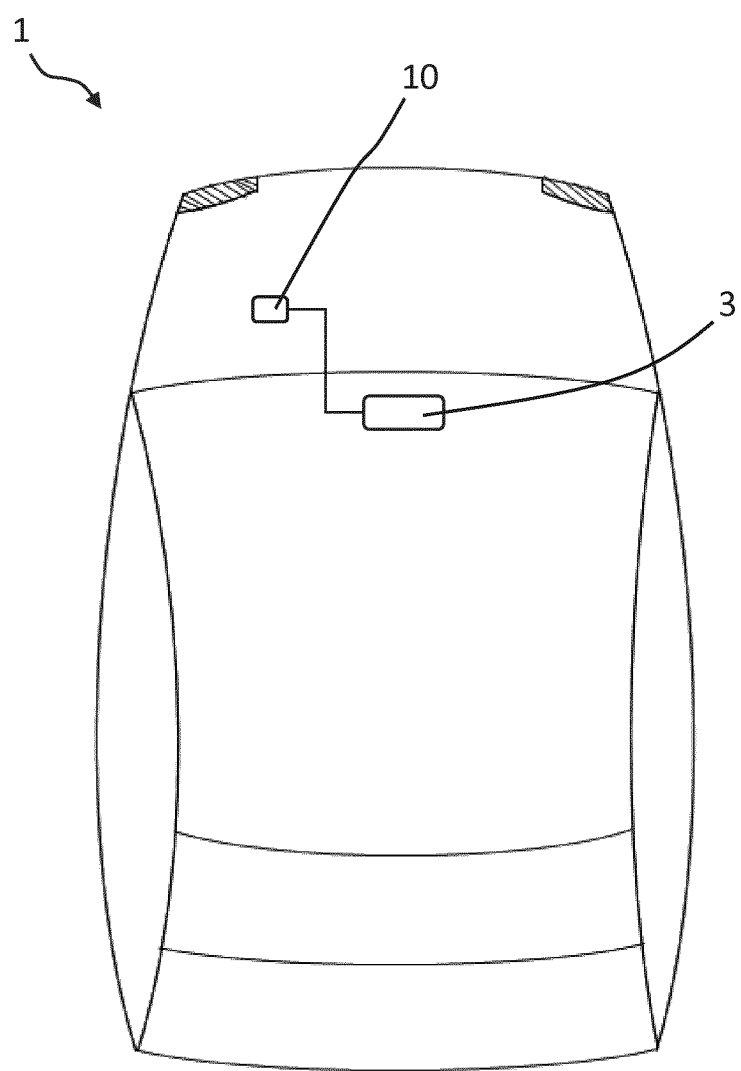
FIG. 1 shows a schematic exemplary embodiment of a motor vehicle incorporating teachings of the present disclosure.

In some embodiments, there is an apparatus for ascertaining a heating temperature of a heating element for an electrically heatable catalytic converter comprises the heating element and the catalytic converter, which are arranged within a catalytic converter housing, and a first temperature sensor and a second temperature sensor, which are arranged within the catalytic converter housing, wherein the first temperature sensor is arranged closer to the heating element than the second temperature sensor with respect to an exhaust gas flow direction within the catalytic converter housing. A heating temperature of a heating element for a catalytic converter can be reliably ascertained by means of the described apparatus and this can contribute to keeping pollutant emissions low during operation of a motor vehicle.

It In some embodiments, there is an electrically heatable catalytic converter in which the heating element is already activated before an internal combustion engine of the motor vehicle is started in order to be able to supply heat to the catalytic converter more quickly when the engine is started and to set an operating temperature which is useful for exhaust gas aftertreatment. One of the problems that arises with a conventional exhaust gas temperature sensor is that the temperature of the heating element cannot be monitored when the engine is at a standstill or is not in operation since the temperature of the heating element is detected or estimated on the basis of the gas flowing through the catalytic converter housing with the engine running. Without gas flow, the heating element according to a design of this kind of a catalytic converter system can rapidly overheat and be damaged.

Using the described apparatus, it is possible to detect and limit the temperature of the heating element in a simple and reliable manner and an advantageous operating state of the catalytic converter system can be set, in which operating state the heatable catalytic converter can already be activated before the internal combustion engine of the motor vehicle is started in order to contribute to reduced emission of pollutants. The function of electric heating of a catalytic converter can therefore also be used when the engine is at a standstill or is not in operation. A relatively high heating output and a correspondingly rapid increase in temperature can also be initiated in a reliable manner by means of the described apparatus.

In some embodiments, the apparatus comprises a shielding which is arranged between the first and the second temperature sensor with respect to the exhaust gas flow direction within the catalytic converter housing, so that the second temperature sensor is shielded from thermal radiation of the heating element. The shielding has, for example, two metal sheets which extend between the two temperature sensors. The metal sheets can be of straight or planar design or have a prespecified curvature which forms a useful shielding of the second, referencing temperature sensor. In addition, the shielding can also have just one shielding element or more than two shielding elements which are designed as metal sheets, ceramic or in some other way in order to form shade for the second temperature sensor with respect to the thermal radiation of the heating element.

In some embodiments, the apparatus comprises a sensor interface which is arranged on the catalytic converter housing and is designed for mechanically receiving the first and/or the second temperature sensor. An interface of this kind renders possible simple installation of the temperature sensors and also stable and secure retention of the temperature sensors in a predefined position. In particular, the sensor interface can be realized as a threaded opening into which the temperature sensors can be screwed using corresponding retaining means. The sensor interface can also comprise a receiving opening which, in an existing catalytic converter system, is already designed so that an existing receiving opening is additionally used to also receive a further, referencing temperature sensor and possibly also a shielding which is provided. Therefore, components can be added to an existing catalytic converter system with a particularly low level of expenditure, so that it is possible to ascertain a heating temperature of the heating element according to the described arrangement in a particularly reliable manner.

In some embodiments, the first and the second temperature sensor can be a common sensor assembly. If a shielding is provided, this can likewise form part of a common sensor assembly. In this way, it is possible to fit and service the described apparatus in a particularly simple manner by way of the sensor assembly being introduced into the sensor interface, for example in a screwable or latchable manner, and being removable from said interface again in a correspondingly simple manner if desired.

As an alternative to a common sensor assembly in which the two temperature sensors are integrated close to one another, the temperature sensors can be installed in the catalytic converter housing separately. A shielding of the thermal radiation between the two temperature sensors can then also be dispensed with depending on the site of installation. For example, the first temperature sensor can be at a distance of 50 millimeters from the heating element, while the second temperature sensor can be arranged at a distance of 15-20 centimeters from the first temperature sensor, so that a sufficient temperature difference, which allows the heating temperature of the heating element to be ascertained in a reliable and precise manner, can be determined.

In this way, an increased temperature in the region of the thermal radiation of the heating element can be detected by means of the first temperature sensor, while an ambient temperature, which serves for reference and differs from the first temperature, can be measured by means of the second temperature sensor at a sufficient distance from the heating element. In addition, it is also possible, under certain circumstances, to determine the exhaust gas temperature and therefore the heating temperature of the heating element in a sufficiently accurate manner by means of model calculations, so that the second temperature sensor as reference sensor can be dispensed with.

The first and/or the second temperature sensor are/is each designed, for example, as an exhaust gas temperature sensor and have/has a thermistor and/or a thermocouple by means of which a respective temperature in the exhaust gas section of the catalytic converter housing can be measured.

Use of conventional thermoelectric sensors in pyrometers for contactless temperature measurement is generally not useful in exhaust gas systems of internal combustion engines on account of the stringent mechanical, thermal, and chemical requirements. The temperature of the heating element can be detected by means of suitable temperature sensors by way of heating the respective temperature sensor by means of the radiation output of the surface of the heating element being evaluated.

The radiation output is a measure of an irradiated quantity of heat per unit time and increases in the temperature range which is relevant to the heating element with the fourth power of the temperature of the surface. Since substantially relatively high temperatures in the range of 600° C. to 1000° C. are to be detected for monitoring the heating element and these temperatures usually lie above the current exhaust gas temperature in the heating mode, said detection can be performed using conventional exhaust gas temperature sensors. An exhaust gas temperature sensor is fitted as a first temperature sensor such that it is heated by the radiation output of the heating element.

The second temperature sensor is arranged as a reference sensor behind the first temperature sensor such that the thermal radiation of the heating element does not influence it or does so to a significantly lesser extent. The second temperature sensor is preferably shaded from the thermal radiation by means of suitably shaped shielding metal sheets, so that this second temperature sensor detects substantially only the ambient temperature within the catalytic converter system.

Depending on the current temperature of the first temperature sensor and its ambient temperature, the temperature of the first temperature sensor rises as soon as the heating element is active and heats the catalytic converter. At the relevant high temperatures, the radiation output of the heating element is high enough that, in spite of metal surfaces which have a relatively low coefficient of emission or absorption, of radiators and absorbers, a sufficient radiation output for an adequate measurement effect acts on the temperature sensor. At present, the heating element forms the radiator and the first temperature sensor forms an absorber.

The time gradient of the differential temperature between the first temperature sensor and the referencing second temperature sensor element forms a measure of the temperature of the surface of the heating element. Since the temperature of the absorber or of the first temperature sensor also determines the absorption and transmission of radiation energy, the gradient of the differential temperature is weighted with the reference temperature which can be determined by means of the second temperature sensor. If the exhaust gas temperature rises, for example, during the measurement operation, said exhaust gas temperature is likewise detected by means of the second temperature sensor and can be taken into account for correcting the measured gradient of the differential temperature.

A temperature distribution over the surface of the heating element is not completely homogeneous and, on account of the physics of the thermal radiation, hot regions form which have an overproportional effect on the radiation output since this rises per unit area with the fourth power of the temperature. Knowing this property is of significant importance for forming overheating protection for the heating element since it is not the average temperature but rather the hottest points of the heating element that are critical for the radiation output.

The apparati described herein can be used to ascertain the surface temperature of the heating element indirectly by means of the thermal radiation output and a contribution can be made to reliable functionality of the heating element with a long service life. In this case, for example, a sensitive infrared sensor based on semiconductors is not necessary, but rather the functional principle of robust exhaust gas temperature sensors can be used. In particular, it is useful for relatively high temperatures to be measured, at which relatively high temperatures the radiation outputs are high, in order to allow the heating temperature of the heating element to be reliably ascertained. Owing to the use of two temperature sensor elements, one of which is arranged directly in the radiation region of the heating element and the second temperature sensor element for ascertaining the local ambient temperature is positioned at a distance from and/or shielded from the first temperature sensor, the temperature of the heating element can also be precisely ascertained in the absence of an exhaust gas flow.

Therefore, a sensor system with a heatable catalytic converter can be formed by means of the apparatus, it being possible to realize the required components of said sensor system, in particular, by means of available technologies. Components of this kind have already proven suitable in exhaust gas applications. In addition, the second temperature sensor which serves as a reference sensor can be provided together with the first temperature sensor in a common sensor assembly, so that only one additional temperature sensor is arranged in the catalytic converter housing in a position, which is provided in any case, for the sensor assembly. Therefore, no additional expenditure is incurred for fitting the sensor assembly and the described apparatus can be produced and integrated into existing catalytic converter systems in a particularly cost-effective manner.

Some embodiments of the teachings herein include a motor vehicle which comprises the above-described apparatus for ascertaining a heating temperature of a heating element for an electrically heatable catalytic converter. In this case, the apparatus is arranged in or on the motor vehicle. Since the motor vehicle comprises a further embodiment of the above-described apparatus, if applicable, properties and features which have been described above in connection with the apparatus are also disclosed for the motor vehicle, and vice versa.

In some embodiments, a method for ascertaining a heating temperature of a heating element for an electrically heatable catalytic converter comprises actuating the heating element for heating the catalytic converter and receiving a first temperature measurement signal by means of a first temperature sensor, which first temperature measurement signal is representative of a first temperature within a catalytic converter housing. The method further comprises receiving a second temperature measurement signal by means of a second temperature sensor, which second temperature measurement signal is representative of a second temperature within the catalytic converter housing. The method further comprises ascertaining a temperature gradient over time depending on the first and the second temperature measurement signal and ascertaining a heating temperature of the heating element depending on the ascertained temperature gradient over time.

A heating temperature of a heating element for a catalytic converter can be reliably ascertained by means of the described method and this can contribute to keeping pollutant emissions low during operation of a motor vehicle. In particular, the method can be carried out by means of the above-described apparatus, so that, if applicable, properties and features which have been described above in connection with the apparatus for ascertaining a heating temperature of the heating element for a catalytic converter are also disclosed for the method, and vice versa.

In some embodiments, ascertaining a heating temperature of the heating element is carried out depending on provided data which comprise system-specific information about the apparatus, by means of which the method can be carried out. System-specific information of this kind can comprise, for example, data of a model calculation, on the basis of which an exhaust gas temperature can be determined in a sufficiently accurate manner. As an alternative or in addition, the provided data comprise information of empirically ascertained system-specific characteristic maps which have been generated, for example, depending on thermal and geometric boundary conditions of the catalytic converter system. Taking into account the complex radiation properties in a catalytic converter system, it is advantageous within the scope of the method for ascertaining a heating temperature of the heating element for an electrically heatable catalytic converter to combine calibrated characteristic maps and data based on model calculation.

Elements of the same design or function are denoted by the same reference symbols throughout the figures.

FIG. 1 illustrates a schematic plan view of an exemplary embodiment of a motor vehicle 1 which comprises an apparatus 10 and a control unit 3, which are coupled to one another in a signal-transmitting manner. As is explained with reference to the following FIGS. 2 and 3, the apparatus 10 allows a heating temperature of a heating element 11 for an electrically heatable catalytic converter 12 to be reliably ascertained and contributes to keeping pollutant emissions low during operation of the motor vehicle 1.

Figure 2:
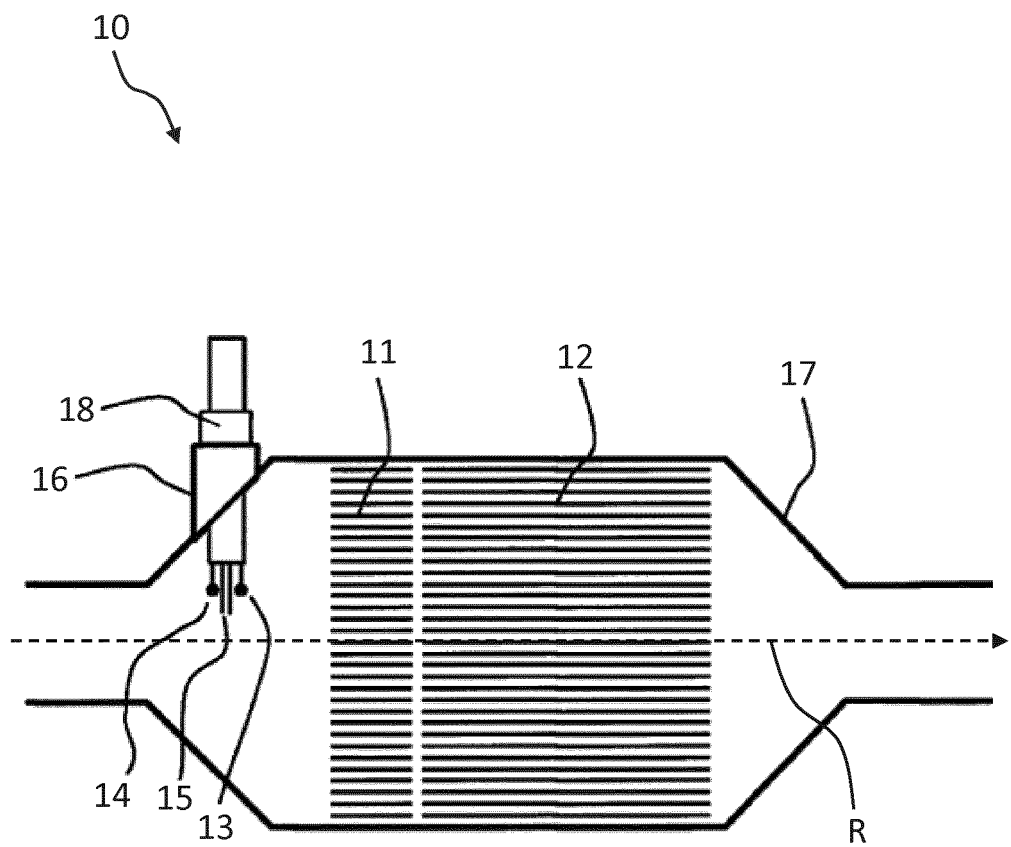
FIG. 2 shows a schematic exemplary embodiment of an apparatus for ascertaining a heating temperature of a heating element for an electrically heatable catalytic converter incorporating teachings of the present disclosure.

According to the exemplary embodiment schematically illustrated in FIG. 2, the apparatus 10 comprises the heating element 11 and the catalytic converter 12, which are arranged within a catalytic converter housing 17. The apparatus 10 further comprises a first temperature sensor 13 and a second temperature sensor 14, which are arranged within the catalytic converter housing 17, wherein the first temperature sensor 13 is arranged closer to the heating element 11 than the second temperature sensor 14 with respect to an exhaust gas flow direction R within the catalytic converter housing 17.

A catalytic converter system which can contribute to low-pollution operation of the motor vehicle 1 can be realized by means of the apparatus 10. The heating element 11 and also the catalytic converter 12 are, for example, of honeycomb design and optionally installed within the catalytic converter housing 17 such that the catalytic converter 12 supports the heating element 11. The catalytic converter housing 17 has a sensor interface 16 which has, for example, a threaded adapter into which a sensor assembly 18 can be screwed, which sensor assembly comprises the first and the second temperature sensor 13 and 14.

In some embodiments, the apparatus 10 has a shielding 15 which forms shade for the second temperature sensor 14 with respect to the thermal radiation of the heating element 11, so that a referencing ambient temperature of the gas which is located in the catalytic converter housing 17 can be measured by means of the second temperature sensor 14. The shielding 15 is arranged between the two temperature sensors 13 and 14 with respect to the exhaust gas flow direction R and is embodied, for example, in the form of two metal sheets. Therefore, the two temperature sensor elements 13 and 14 are separated by the shielding 15. In some embodiments, the shielding 15 also realizes part of the sensor assembly 18, so that the heating temperature of the heating element 11 can be reliably ascertained in a particularly simple and space-saving manner. In addition, a compact, integral sensor assembly 18 contributes to simple fitting and low-expenditure servicing of the associated components. In addition, the sensor assembly 18, at its end which is averted from the catalytic converter housing 17, can be couplable to a CAN interface by means of an electronic module, so that signal transmission between the control unit 3 of the motor vehicle 1 and the sensor assembly 18 can be set up.

The first temperature sensor 13 faces the heating element 11 and absorbs the thermal radiation of the heating element 11. The second temperature sensor 14 realizes a reference sensor element which is shielded from the thermal radiation of the heating element 11, for example, by suitably shaped shielding metal sheets of the shielding 15. In this way, it is possible to ensure that the second temperature sensor 14 substantially detects the temperature of the ambient exhaust gas.

The catalytic converter 12 is designed, for example, as a metal-support catalytic converter. The heating element 11 is constructed, for example, like a short section of a metal-support catalytic converter of this kind and can therefore expediently be installed together with the catalytic converter 12 in the catalytic converter housing 17, so that the heating element 11 can be supported by the catalytic converter 12. The two temperature sensors 13 and 14 can also be installed, rather than into a common sensor assembly 18, into the receptacle 16 as two separate sensors within the catalytic converter housing 17. A shielding 15 from the thermal radiation of the heating element 11 can then also be dispensed with, depending on the site of installation, provided that the temperature sensors 13, 14 are at a sufficiently large distance from one another that it is possible to ascertain the heating temperature of the heating element 11 in a reliable manner. Furthermore, it is optionally also possible to determine an exhaust gas temperature and, based on this, a heating temperature of the heating element 11 in a sufficiently accurate manner by means of model calculations, so that the second temperature sensor 14 as a reference sensor can be dispensed with.

The temperature sensors 13, 14 used can be exhaust gas temperature sensors. For example, the first and/or the second temperature sensor 13, 14 have/has a sensor with thermistors (NTC) or thermocouples. A heating temperature of the heating element 11 can be reliably ascertained by means of the described apparatus 10 even if there is no exhaust gas flow within the catalytic converter housing 17. Therefore, the heating element 11 can also already be operated before an associated internal combustion engine is started, wherein the risk of overheating of and damage to the heating element 11 is reduced by means of monitoring the heating temperature. In this way, time for processing pollutant emissions of the internal combustion engine can be obtained by way of the catalytic converter 12, which is provided for reducing pollutants, according to the described apparatus 10 being able to be brought to a useful operating temperature more quickly.

Figure 3:
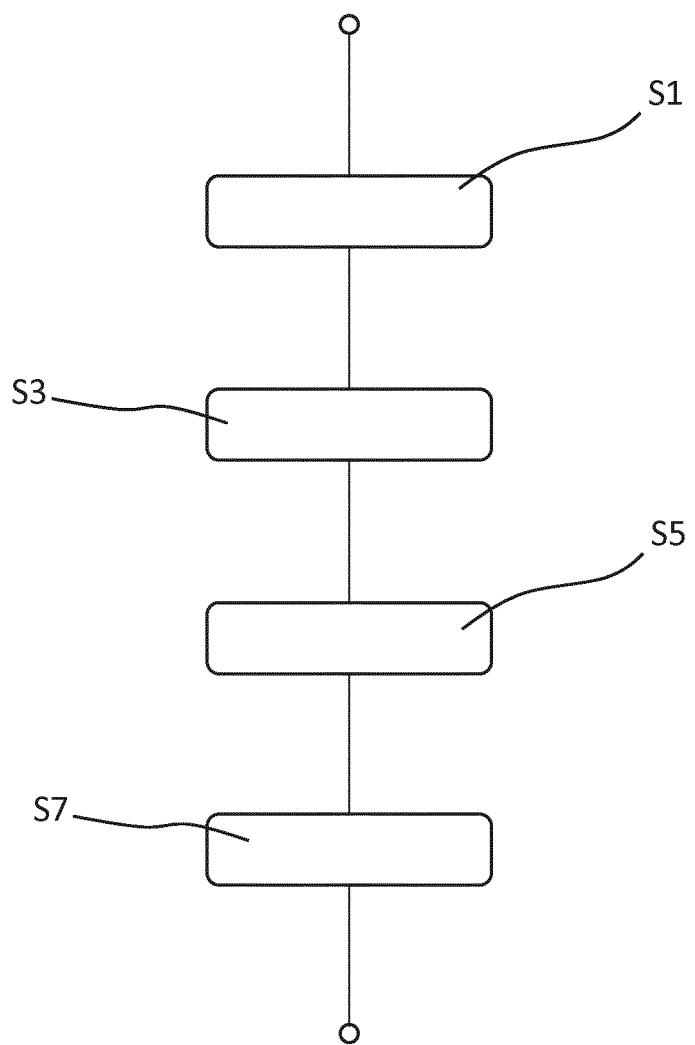
FIG. 3 shows a schematic flowchart for methods for ascertaining a heating temperature of a heating element for an electrically heatable catalytic converter incorporating teachings of the present disclosure.

The heating temperature of the heating element 11 can be monitored by means of a method for ascertaining the heating temperature of the heating element 11 for the electrically heatable catalytic converter 12 in accordance with the flowchart according to FIG. 3.

In a step S1, the heating element 11 is activated, so that consequently the temperature of the heating element 11 is increased. This leads to a radiation disequilibrium between the heating element 11 and the first temperature sensor element 13 and to an increase in the temperature in the position of the first temperature sensor 13.

In a step S3, a first temperature can be detected by means of the first temperature sensor 13, a corresponding first temperature measurement signal can be generated and this can be provided for further processing.

In a step S5, a second temperature can be detected by means of the second temperature sensor 14, a corresponding second temperature measurement signal can be generated and this can be provided for further processing.

Depending on the first and the second temperature measurement signal, in a step S7 a change in temperature per unit time is ascertained, on the basis of which change in temperature the current temperature of the heating element 11 is calculated taking into account the current temperature in the position of the referencing second temperature sensor element 14.

Within the scope of calculations of this kind, system-specific information, such as empirically ascertained characteristic maps and/or model calculation, can also be incorporated, this comprising, for example, data about thermal and geometric boundary conditions and also the radiation properties in the catalytic converter system. On account of the complexity of an exhaust gas or catalytic converter system of this kind, combination of calibrated characteristic maps and model calculation is particularly advantageous when ascertaining the heating temperature of the heating element 11.

A heating temperature of the heating element 11 can be reliably ascertained by means of the described method and this can contribute to keeping pollutant emissions low during operation of the motor vehicle 1. The method can be carried out, for example, by means of the control unit 3 of the motor vehicle 1, which control unit comprises, for example, a data memory and a computer unit for receiving, processing and transmitting data and signals.

If a preheating phase of the heating element 11 is relatively long with respect to thermal time constants of the system components used, a state of equilibrium of the temperature can also occur within the catalytic converter housing 17. In this case, the temperature of the first temperature sensor 13 would asymptotically approximate the radiation and thermal conduction equilibrium which is formed by the first temperature sensor element 13, the heating element 11, the thermal dissipation by the sensor assembly 18 and the gas temperature of the gas which is located within the catalytic converter housing 17.

The change in temperature per unit time at the first temperature sensor 13 would then tend to zero, but this would not mean that the heating temperature of the heating element 11 corresponds precisely to the temperature of the first temperature sensor 13 in terms of value since the radiation equilibrium does not only apply between the heating element 11 and the first temperature sensor element 13. On account of knowing the local temperatures and the difference of the first and second temperatures in the positions of the two temperature sensors 13 and 14, reliable limiting of the temperature of the heating element 11 is possible, however, together with a system-specific calibration of the thermal parameters up to this operating point.

What is claimed is:

1. An apparatus for ascertaining a heating temperature of a heating element for an electrically heatable catalytic converter, the apparatus comprising:
   a catalytic converter housing;
   the heating element arranged within the catalytic converter housing;
   the catalytic converter arranged within the catalytic converter housing;
   a first temperature sensor arranged within the catalytic converter housing upstream of the catalytic converter; and
   a second temperature sensor arranged downstream of the first temperature sensor and upstream of the catalytic converter within the catalytic converter housing with respect to an exhaust gas flow direction within the catalytic converter housing;
   wherein the first temperature sensor is exposed to radiation from the heating element and the second temperature sensor is shielded from radiation from the heating element; and
   a processor programmed to execute a program to:
      actuate the heating element for heating the catalytic converter;
      receive a first temperature measurement signal from the first temperature sensor, the first temperature measurement signal representing a first temperature within the catalytic converter housing;
      receive a second temperature measurement signal from the second temperature sensor, the second temperature measurement signal representing a second temperature within the catalytic converter housing;
      ascertain a temperature gradient over time depending on the first temperature measurement signal and the second temperature measurement signal; and
      ascertain a heating temperature of the heating element depending on the ascertained temperature gradient over time.

2. The apparatus as claimed in claim 1, further comprising a shielding arranged between the first and the second temperature sensor with respect to the exhaust gas flow direction, protecting the second temperature sensor from radiation from the heating element.

3. The apparatus as claimed in claim 2, wherein the shielding comprises two metal sheets.

4. The apparatus as claimed in claim 1, further comprising a sensor interface arranged on the catalytic converter housing and mechanically receiving the first and/or the second temperature sensor.

5. The apparatus as claimed in claim 1, wherein the first temperature sensor and the second temperature sensor comprise a common sensor assembly.

6. The apparatus as claimed in claim 2, wherein:
   the first temperature sensor and the second temperature sensor and the shielding comprise a common sensor assembly; and
   the first temperature sensor, the shielding, and the second temperature sensor are arranged one behind the other with respect to the exhaust gas flow direction.

7. The apparatus as claimed in claim 1, wherein at least one of the first and the second temperature sensor comprises an exhaust gas temperature sensor with a thermistor and/or a thermocouple.

8. A motor vehicle comprising:
   an internal combustion engine;
   a catalytic converter with a heating element;
   a catalytic converter housing surrounding the heating element and the catalytic converter;
   a first temperature sensor arranged in the catalytic converter housing upstream of the catalytic converter; and
   a second temperature sensor arranged in the catalytic converter housing downstream of the first temperature sensor and upstream of the catalytic converter with regard to an exhaust gas flow direction within the catalytic converter housing;
   wherein the first temperature sensor is exposed to radiation from the heating element; and
   the second temperature sensor is shielded from radiation from the heating element; and
   a processor programmed to execute a program to:
      actuate the heating element for heating the catalytic converter;
      receive a first temperature measurement signal from the first temperature sensor, the first temperature measurement signal representing a first temperature within the catalytic converter housing;
      receive a second temperature measurement signal from the second temperature sensor, the second temperature measurement signal representing a second temperature within the catalytic converter housing;

ascertain a temperature gradient over time depending on the first temperature measurement signal and the second temperature measurement signal; and ascertain a heating temperature of the heating element depending on the ascertained temperature gradient over time.

9. A method for ascertaining a heating temperature of a heating element for an electrically heatable catalytic converter, the method comprising:

actuating the heating element for heating the catalytic converter;

receiving a first temperature measurement signal from a first temperature sensor upstream of the catalytic converter, the first temperature measurement signal representing a first temperature within a catalytic converter housing;

receiving a second temperature measurement signal from a second temperature sensor upstream of the catalytic converter, the second temperature measurement signal representing a second temperature within the catalytic converter housing;

ascertaining a temperature gradient over time depending on the first temperature measurement signal and the second temperature measurement signal;

ascertaining a heating temperature of the heating element depending on the ascertained temperature gradient over time; and applying a temperature limit to the heating element, wherein the heating element is deactivated if the heating temperature reaches the temperature limit.

10. The method as claimed in claim 9, wherein ascertaining a heating temperature of the heating element comprises ascertaining the heating temperature of the heating element based at least in part on provided data which comprise system-specific information about the apparatus.

* * * * *